(12) United States Patent
An

(10) Patent No.: US 10,509,280 B2
(45) Date of Patent: Dec. 17, 2019

(54) LIQUID CRYSTAL PANEL

(71) Applicant: Liyang An, Guangdong (CN)

(72) Inventor: Liyang An, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 15/764,927

(22) PCT Filed: Jan. 4, 2018

(86) PCT No.: PCT/CN2018/071305
§ 371 (c)(1),
(2) Date: Mar. 30, 2018

(87) PCT Pub. No.: WO2019/041717
PCT Pub. Date: Mar. 7, 2019

(65) Prior Publication Data
US 2019/0072795 A1    Mar. 7, 2019

(30) Foreign Application Priority Data
Sep. 1, 2017 (CN) .......................... 2017 1 0780677

(51) Int. Cl.
*G02F 1/1362* (2006.01)
*G02F 1/1339* (2006.01)
*G02F 1/1335* (2006.01)

(52) U.S. Cl.
CPC .......... *G02F 1/1362* (2013.01); *G02F 1/1339* (2013.01); *G02F 1/13392* (2013.01);
(Continued)

(58) Field of Classification Search
CPC ......... G02F 1/133305; G02F 1/133514; G02F 1/13394; G02F 2001/13396
See application file for complete search history.

(56) References Cited

U.S. PATENT DOCUMENTS 9,977,280 B2 * 5/2018 Kim .................. G02F 1/133514
2007/0064178 A1    3/2007 Murai
(Continued)

FOREIGN PATENT DOCUMENTS

CN    101042445 A    9/2007
CN    104880850 A    9/2015
(Continued)

OTHER PUBLICATIONS

2017107806775_1st Office Action.

*Primary Examiner* — Hoan C Nguyen
(74) *Attorney, Agent, or Firm* — Andrew C. Cheng

(57) ABSTRACT

A liquid crystal panel includes a plurality of color resist blocks and a plurality of spacers arranged at one side of the color resist blocks. Each color resist block includes a first zone and a second zone arranged in sequence in the first direction. The plurality of color resist blocks include a first color resist block, a second color resist block, and a third color resist block arranged in sequence in the first direction. The first zone of the third color resist block is formed with a first through hole. The third color resist block includes a first extension extending from the second zone of the third color resist block in a first direction. The plurality of spacers include a first spacer, which is set at a location corresponding to and the first extension section or the second zone of the third color resist block.

9 Claims, 6 Drawing Sheets

(52) U.S. Cl.
CPC .... *G02F 1/13394* (2013.01); *G02F 1/133514* (2013.01); *G02F 1/136286* (2013.01); *G02F 2001/13396* (2013.01); *G02F 2001/136222* (2013.01); *G02F 2201/52* (2013.01)

(56) References Cited

U.S. PATENT DOCUMENTS

| | | | |
|---|---|---|---|
| 2007/0216832 A1* | 9/2007 | Takahashi | G02F 1/133516 349/106 |
| 2010/0231838 A1* | 9/2010 | Sawasaki | G02F 1/13392 349/123 |
| 2011/0069258 A1* | 3/2011 | Joo | G02B 5/201 349/106 |
| 2011/0104974 A1 | 5/2011 | Ryu | |

FOREIGN PATENT DOCUMENTS

| | | |
|---|---|---|
| CN | 105911775 A | 8/2016 |
| CN | 205427389 U | 8/2016 |
| CN | 106154650 A | 11/2016 |
| CN | 106547139 A | 3/2017 |
| CN | 107340627 A | 11/2017 |

\* cited by examiner

LIQUID CRYSTAL PANEL

CROSS REFERENCE TO RELATED APPLICATIONS

This application claims the priority of Chinese Patent Application No. 201710780677.5 filed on Sep. 1, 2017, titled "Liquid Crystal Panel", the disclosure of which is incorporated herein by reference in its entirety.

BACKGROUND OF THE INVENTION

1. Field of the Invention

The present invention relates to the field of display technology, and more particularly to a liquid crystal panel.

2. The Related Arts

With the progress of the liquid crystal display technology, curved liquid crystal displays are available, which possess a screen having an arc surface to provide an effect of wide full-view image so that the same experience of viewing can be achieved at both a central portion and a peripheral portion of the screen and distortion of off-axis viewing can be reduced for viewing at a short distance thereby providing better experience of viewing.

A process that is currently available for manufacturing curved liquid crystal panel is as follows. A liquid crystal panel in a planar state is manufactured. The liquid crystal panel in the planar state is then curved to form a curved liquid crystal panel. Due to the characteristics of the curved liquid crystal panel, relative shifting occurs between an array substrate and a liquid crystal panel after being curved, and this causes movements of spacers that are arranged between the array substrate and the liquid crystal panel. In the formation of a film of a color resist material, edge areas between adjacent ones of different color resists often form color resist horn areas that project outward. When the spacers are moved to the relatively high locations of the color resist horn areas, local thickness abnormality of the liquid crystal panel may result and poor homogeneity of liquid crystal panel thickness may be caused, leading to issues of water marks and dark state color shifting, and eventually making product yield low and causing loss.

SUMMARY OF THE INVENTION

In view of the above problem, an object of this application is to provide a liquid crystal panel that improves thickness uniformity of the liquid crystal panel during a curving operation thereof.

In order to overcome the deficiencies existing in the background art, this application provides a liquid crystal panel, which comprises a plurality of color resist blocks and a plurality of spacers respectively arranged at one side of the color resist blocks, each of the color resist blocks comprising a first zone and a second zone arranged in sequence in a first direction, the plurality of color resist blocks comprising a first color resist block, a second color resist block, and a third color resist block arranged in sequence in the first direction, the first zone of the third color resist block being formed with a first through hole, the third color resist block comprising a first extension section extending from the second zone of the third color resist block, the first extension section extending in the first direction, the plurality of spacers comprising a first spacer, the first spacer being set at a location corresponding to the first extension section or the second zone of the third color resist block.

In the above, the first zone of the first color resist block and the second zone of the second color resist block are formed with a second through hole and a third through hole, respectively, and the plurality of spacers further comprise a second spacer and a third spacer, the second spacer and the third spacer being set at locations corresponding, respectively, to the second zone of the first color resist block and the first zone of the second color resist block.

In the above, the first zone of the first color resist block and the second zone of the second color resist block are formed with a second through hole and a third through hole, respectively, and the plurality of spacers further comprise a second spacer and a third spacer, the second spacer and the third spacer being set at locations corresponding, respectively, to the first zone of the first color resist block and the first zone of the second color resist block.

In the above, the plurality of color resist blocks further comprise a fourth color resist block, the fourth color resist block being located at one side of the third color resist block that is distant from the second color resist block, the fourth color resist block having a first zone that comprises a first receiving notch formed to receive the first extension section, the fourth color resist block having a second zone that is formed with a fourth through hole, the first receiving notch being connected to and in communication with the fourth through hole.

In the above, the plurality of color resist blocks further comprise a fifth color resist block and a sixth color resist block, and the fourth color resist block, the fifth color resist block, and the sixth color resist block are arranged in sequence in the first direction, the sixth color resist block comprising a second extension section extending from a first zone of the sixth color resist block, the second extension section having an extension direction that is opposite to the first direction, the sixth color resist block having a second zone that is formed with a fifth through hole, the fifth color resist block having a second zone that comprises a second receiving notch formed to receive the second extension section, the plurality of spacers further comprising a fourth spacer, the fourth spacer being set at a location corresponding to the second extension section or the first zone of the sixth color resist block.

In the above, a first zone of the fifth color resist block is formed with a sixth through hole, the sixth through hole being connected to and in communication with the second receiving notch.

In the above, the plurality of color resist blocks further comprise a seventh color resist block, the seventh color resist block and the first color resist block being arranged in a second direction, the second direction and the first direction intersecting each other, the plurality of spacers further comprising a fifth spacer, the fifth spacer being set at a location corresponding to a first zone of the seventh color resist block, the seventh color resist block having a second zone that is formed with a seventh through hole.

In the above, the plurality of color resist blocks further comprise an eighth color resist block and a ninth color resist block, and the seventh color resist block, the eighth color resist block, and the ninth color resist block are arranged in sequence in the first direction, the eighth color resist block having a structure similar to a structure of the fifth color resist block, the ninth color resist block having a structure similar to a structure of the sixth color resist block, the eighth color resist block comprising a third extension section, the plurality of spacers further comprising a sixth spacer, the sixth spacer being set at a location corresponding to the third extension section or a first zone of the eighth color resist block.

In the above, the plurality of color resist blocks further comprise a tenth color resist block, the tenth color resist block being set at one side of the ninth color resist block that is distant from the eighth color resist block, the tenth color resist block having a structure similar to the structure of the first color resist block, the plurality of spacers further comprising a seventh spacer, the seventh spacer being set at a location corresponding to a second zone of the tenth color resist block.

In the above, the plurality of color resist blocks further comprise an eleventh color resist block and a twelfth color resist block, and the tenth color resist block, the eleventh color resist block, and the twelfth color resist block are arranged in sequence in the first direction, the eleventh color resist block having a structure similar to the structure of the second color resist block, the twelfth color resist block having a structure similar to the structure of the third color resist block, the twelfth color resist block comprising a fourth extension section, the plurality of spacers further comprising an eighth spacer and a ninth spacer, the eighth spacer being set at a location corresponding to a first zone of the eleventh color resist block, the ninth spacer being set at a location corresponding to the fourth extension section or a second zone of the twelfth color resist block.

This application provides a liquid crystal panel, in which a color resist block is provided with an extension section and a spacer is set at a location corresponding to a second zone of the color resist block or the extension section so that when the liquid crystal panel is curving and the spacer moves relative to the color resist block, the arrangement of the extension section increases a length of the color resist block in a first direction, namely increasing an available space for movement of the spacer on the color resist block, to prevent the spacer from moving to a color resist horn area (an interfacing area between adjacent color resist blocks) that has a relatively high location or a through hole region that has a relatively low location, thereby improving thickness uniformity of the liquid crystal panel in a process of curving and thus enhancing display quality and product yield of the liquid crystal panel.

BRIEF DESCRIPTION OF THE DRAWINGS

To more clearly explain the technical solution proposed in embodiments of this application, a brief description of the drawings that are necessary for describing the embodiments will be given below. It is obvious that the drawings that will be described below show only some embodiments of this application. For those having ordinary skills of the art, other drawings may be readily available from these attached drawings without the expense of creative effort and endeavor.

DETAILED DESCRIPTION OF THE PREFERRED EMBODIMENTS

Figure 1:
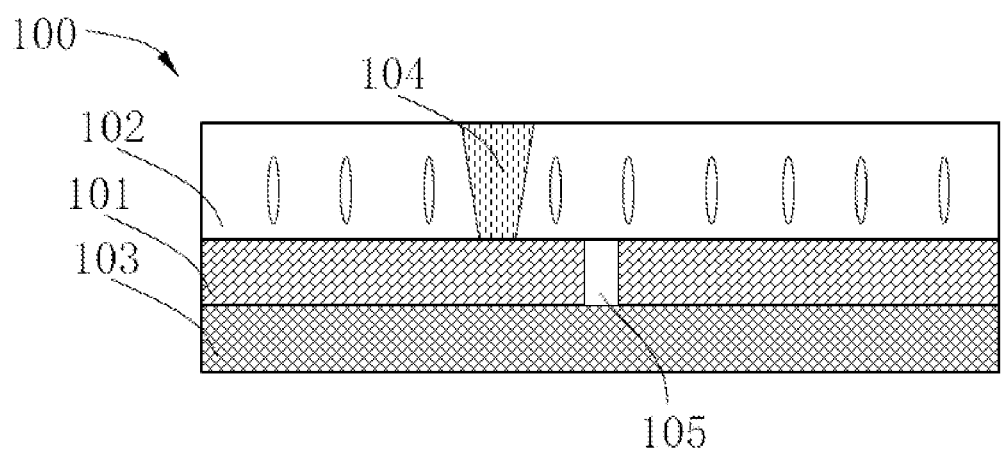
FIG. 1 is a schematic view illustrating a structure of a part cross-section of a liquid crystal panel provided in embodiments of this application.

A clear and complete description will be given to technical solutions provided by embodiments of this application with reference to the attached drawings of the embodiments of the present invention. In addition, the description given below for each embodiment is made with reference to the attached drawings to exemplify specific embodiments that this application may be put into practice. Direction related terminology used in this application, such as "up", "down", "front", "rear", "left", "right", "internal", "external", and "lateral", is provided as direction defined in the drawing sheets. Thus, using the direction related terminology, which is for better and more clearly describing and understanding of this application and is not for indicating or implying any specific orientation that a device or an element described must take or the device or element must be structured or operated at a specific orientation, should thus be appreciated as not imposing constraints to this application.

In the description of this application, it should be noted that unless specifically required and set, the terms "installation", "connection", and "jointing" as used herein should be interpreted in a broad way, such as being fixedly connected or removably connected, or integrally connected; or being mechanically connected; or being directly connected, or indirectly connected with intervening media therebetween, or interiors of two elements being in communication with each other. For those having ordinary skills in the art, the specific meaning of these terms used in this application can be appreciated for any actual situations. Further, in the description of the present invention, unless stated otherwise, "multiple" means two or more than two.

Referring to FIG. 1, FIG. 1 shows a liquid crystal panel 100 provided in this application. The liquid crystal panel 100 comprises a plurality of color resist blocks and a plurality of spacers respectively arranged at one side of the color resist blocks. The liquid crystal panel 100 may comprise a color filter substrate, a liquid crystal layer, and a thin-film transistor (TFT) array substrate that are arranged in sequence. The spacers are arranged between the array substrate and the color filter substrate to define a liquid crystal cell thickness, wherein the spacers can be formed on the array substrate or formed on the color filter substrate. The liquid crystal panel 100 may include a COA (Color Filter on Array) plus POA (Photo Spacer (PS) on Array) structure, namely the liquid crystal panel 100 comprising a TFT array layer 103, a color filter layer 101, and a liquid crystal layer 102 that are arranged in sequence, and the spacers 104 can be formed on the color filter layer 101. In the instant embodiment, a liquid crystal panel 100 having a COA plus POA structure is taken as an example for illustration. In the COA plus POA structure liquid crystal panel 100, through holes 105 are through hole 105 often formed in the color filter layer 101 for connection to be easily made between conductive layers on upper and lower sides of the color filter layer 101.

Figure 2:
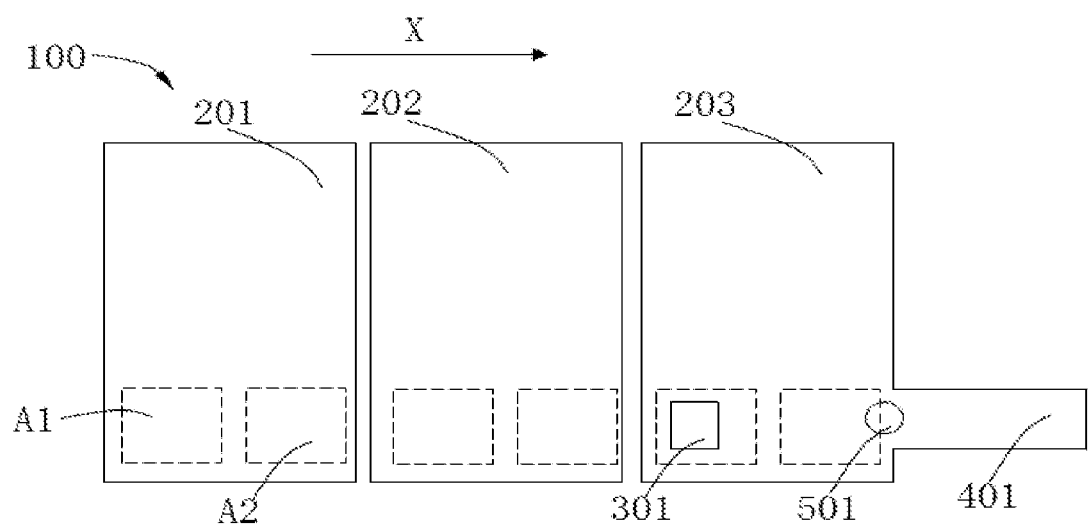
FIG. 2 is a schematic view illustrating a part structure of a color filter layer of the liquid crystal panel provided in embodiments of this application.

Referring to FIG. 2, each of the color resist blocks comprises a first zone A1 and a second zone A2 arranged in sequence in a first direction X, wherein the color resist block is of a rectangular shape and the first direction X can be collinear with an extension direction of short edges of the color resist block. The first zone A1 and the second zone A2 are arranged to be respectively adjacent to two opposite sides of the color resist block. The plurality of color resist blocks comprise a first color resist block 201, a second color resist block 202, and a third color resist block 203 arranged in sequence in the first direction X, wherein adjacent ones of the color resist blocks form therebetween color resist horn areas that have a relatively high location. The first zone A1 of the third color resist block 203 is provided with a first through hole 301, and the first through hole 301 is used to connect between conductive layers on upper and lower sides of the third color resist block 203. Due to the arrangement of the first through hole 301, a color resist opening area that has a relatively low location is formed around the first through hole 301. The third color resist block 203 comprises a first extension section 401 extends from the second zone A2 of the third color resist block 203 and the first extension section 401 extends in the first direction X. The plurality of spacers comprise a first spacer 501. The first spacer 501 is set at a location corresponding to the first extension section 401 or the second zone A2 of the third color resist block 203.

In this application, the color resist block 203 is provided with the extension section 401 and the spacer 501 is set at a location corresponding to the second zone A2 of the color resist block 203 or the extension section 401 so that when the liquid crystal panel 100 is curving and the spacer 501 moves relative to the color resist block 203, the arrangement of the extension section increases a length of the color resist block 203 in the first direction X, namely increasing an available space for movement of the spacer 501 on the color resist block 203, to prevent the spacer 501 from moving to the color resist horn areas that have a relatively high location or the color resist opening area that has a relatively low location, thereby improving thickness uniformity of the liquid crystal panel 100 in a process of curving and thus enhancing display quality and product yield of the liquid crystal panel 100.

Optionally, the first spacer 501 is connected to the third color resist block 203 and is located on the first extension section 401 at a location close to the second zone A2 of the third color resist block 203 or is located on the second zone A2 of the third color resist block 203 at a location close to the first extension section 401, or is located on an interfacing area between the first extension section 401 and the second zone A2 of the third color resist block 203. Preferably, the first spacer 501 is located on the interfacing area between the first extension section 401 and the second zone A2 of the third color resist block 203, namely the first spacer 501 is set at an intermediate location between the color resist horn area and the color resist opening area.

Optionally, a surface of the first extension section 401 that faces the liquid crystal layer is smoothly connected to a surface of the third color resist block 203 that faces the liquid crystal layer in order to allow the first spacer 501 to move, smoothly, along the third color resist block 203 to thereby reduce the influence caused by the movement of the first spacer 501 along the third color resist block 203 on the cell thickness of the liquid crystal panel 100.

Figure 3:
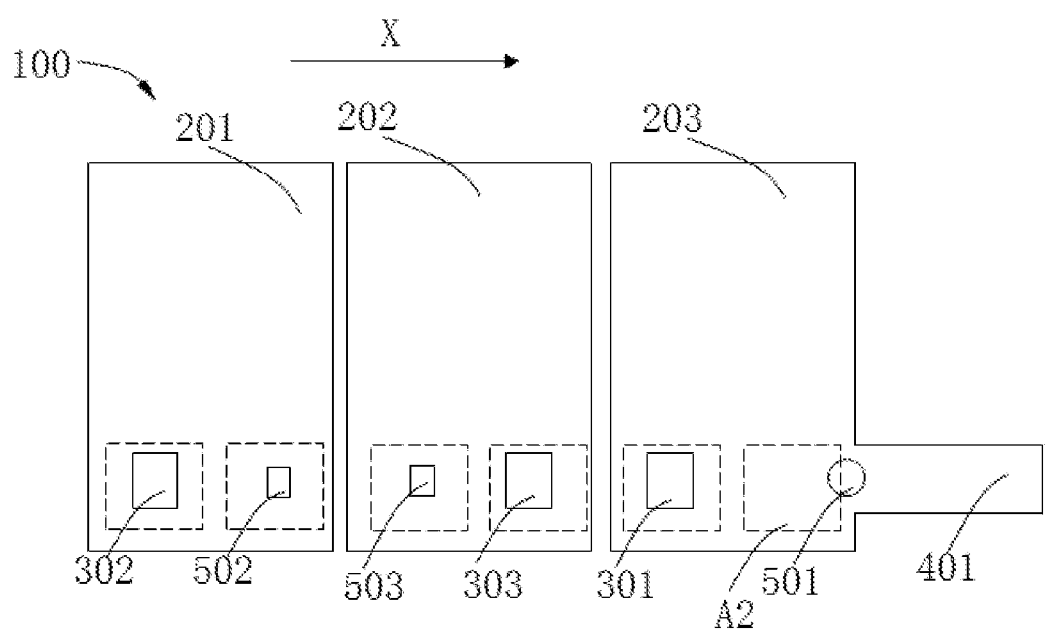
FIG. 3 is a schematic view illustrating a part structure of a color filter layer of a liquid crystal panel provided in a first example embodiment of this application.

Referring to FIG. 3, in one embodiment, the first zone A1 of the first color resist block 201 and the second zone A2 of the second color resist block 202 are respectively formed with a second through hole 302 and a third through hole 303. The second through hole 302 and the third through hole 303 are provided for conductive connection between conductive layers on upper and lower sides of the first color resist block 201 and the second color resist block 202, respectively. The plurality of spacers further comprise a second spacer 502 and a third spacer 503. The second spacer 502 and the third spacer 503 are set at locations corresponding to the second zone A2 of the first color resist block 201 and the first zone A1 of the second color resist block 202, respectively.

In this embodiment, when the second spacer 502 and the third spacer 503 are both moving in the same direction, such as the second spacer 502 and the third spacer 503 both moving in the first direction X, the second spacer 502 is moving toward the color resist horn area that has a relatively high location so that the movement increases the liquid crystal cell thickness, while the third spacer 503 is moving toward the third through hole 303 that has a relatively low location so that the movement makes the liquid crystal cell thickness reduced. As such, the influences that movement of the third spacer 503 and the movement of the second spacer 502 cause on the liquid crystal cell thickness may cancel each other to thereby reduce the overall influence that the movements of the spacers cause on the liquid crystal cell thickness in a process of curving the liquid crystal panel 100.

Figure 4:
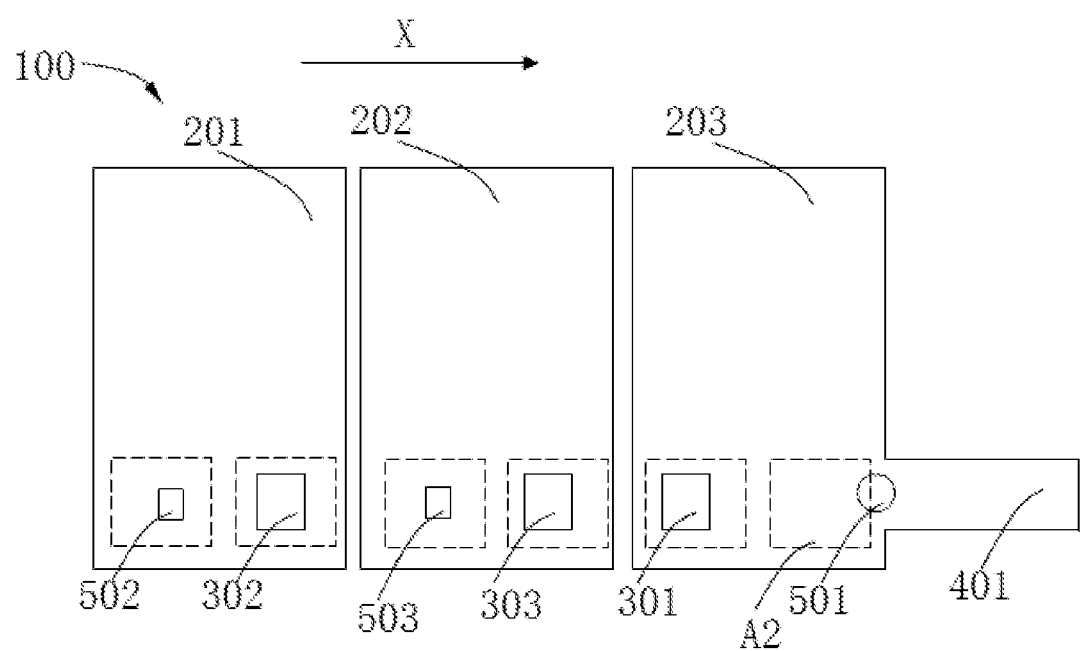
FIG. 4 is a schematic view illustrating a part structure of a color filter layer of a liquid crystal panel provided in a second example embodiment of this application.

Referring to FIG. 4, in another embodiment, the second zone A2 of the first color resist block 201 and the second zone A2 of the second color resist block 202 are respectively formed with a second through hole 302 and a third through hole 303 and the plurality of spacers further comprise a second spacer 502 and a third spacer 503. The second spacer 502 and the third spacer 503 are set at locations corresponding to the first zone A1 of the first color resist block 201 and the first zone A1 of the second color resist block 202.

In this embodiment, when the second spacer 502 and the third spacer 503 are both moving in different directions, such as the second spacer 502 moving in the first direction X and the third spacer 503 moving in a direction opposite to the first direction X, the second spacer 502 is moving toward the third through hole 303 that has a relatively low location so that the movement makes the liquid crystal cell thickness reduced, while the third spacer 503 is moving toward the color resist horn areas that has a relatively high location so that the movement makes the liquid crystal cell thickness increased. As such, the influences that movement of the third spacer 503 and the movement of the second spacer 502 cause on the liquid crystal cell thickness may cancel each other to thereby reduce the overall influence that the movements of the spacers cause on the liquid crystal cell thickness in a process of curving the liquid crystal panel 100.

Figure 5:
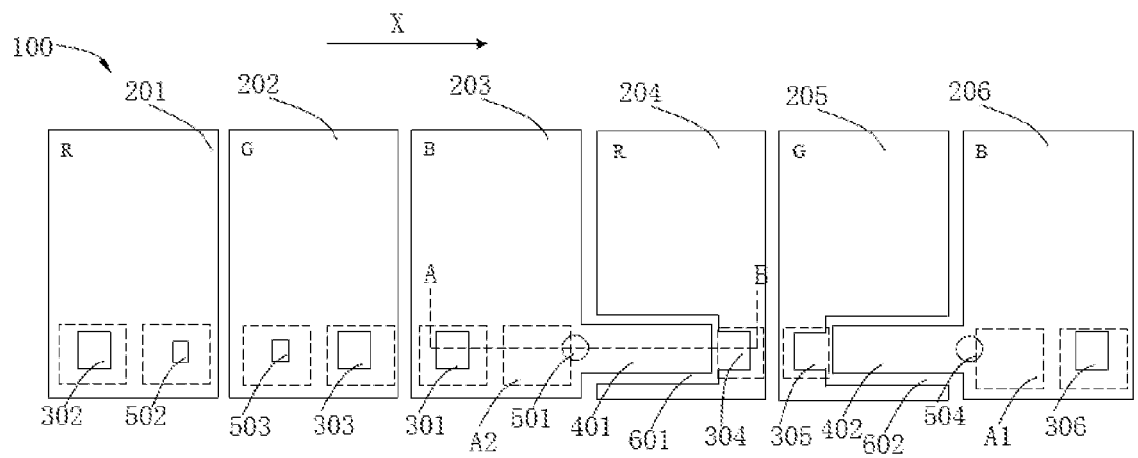
FIG. 5 is a schematic view illustrating a part structure of another color filter layer of the liquid crystal panel provided in the second example embodiment of this application.

Referring to FIG. 5, the plurality of color resist blocks further comprise a fourth color resist block 204. The fourth color resist block 204 is located on one side of the third color resist block 203 that is distant from the second color resist block 202. The first zone A1 of the fourth color resist block 204 comprises a first receiving notch 601 formed to receive the first extension section 401. The second zone A2 of the fourth color resist block 204 comprises a fourth through hole 304. The fourth through hole 304 is provided for conductive connection between conductive layers of upper and lower sides of the fourth color resist block 204. The first receiving notch 601 can be connected to and in communication with the fourth through hole 304 to reduce the color resist horn area formed between the third color resist block 203 and the fourth color resist block 204.

In this application, the first spacer 501 is a primary spacer, while the second spacer 502 and the third spacer 503 are secondary spacers. The secondary spacers have a size that may be smaller than or equal to a size of the primary spacer.

Figure 6:
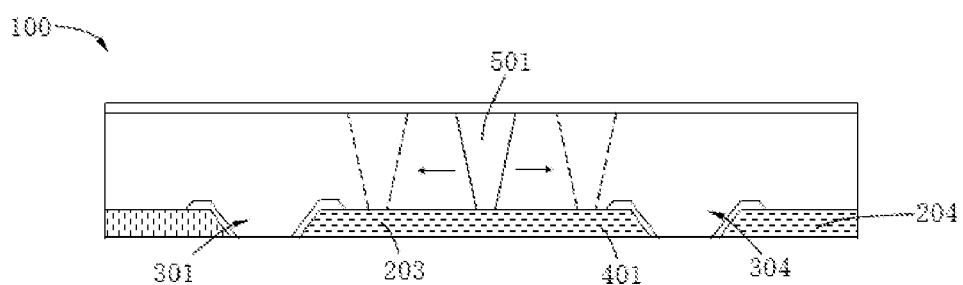
FIG. 6 is a schematic view showing a cross-section taken in AB direction of FIG. 5.

Referring to FIGS. 5 and 6, the plurality of color resist blocks further comprise a fifth color resist block 205 and a sixth color resist block 206. The fourth color resist block 204, the fifth color resist block 205, and the sixth color resist block 206 are arranged, in sequence, in the first direction X. The sixth color resist block 206 comprises a second extension section 402 extending from the first zone A1 of the sixth color resist block 206. The second extension section 402 has an extension direction that is opposite to the first direction X. The second zone A2 of the sixth color resist block 206 comprises a fifth through hole 305, and the fifth through hole 305 is provided for conductive connection between conductive layers of upper and lower sides of the fifth color resist block 205. The second zone A2 of the fifth color resist block 205 comprises a second receiving notch 602 formed to receive the second extension section 402. The plurality of spacers further comprises a fourth spacer 504, and the fourth spacer 504 is set at a location corresponding to the second extension section 402 or the first zone A1 of the sixth color resist block 206. The fourth spacer 504 may be of a structure that is similar to the structure of the first spacer 501 and they both are primary spacers. The relative position of the fourth spacer 504 with respect to the sixth color resist block 206 can be the same as the relative position of the first spacer 501 with respect to the third color resist block 203 and repeated description will be omitted herein.

Further, the first zone A1 of the fifth color resist block 205 comprises a sixth through hole 306. The sixth through hole 306 is connected to and in communication with the second receiving notch 602 in order to reduce the color resist horn area formed between the fifth color resist block 205 and the sixth color resist block 206.

Figure 7:
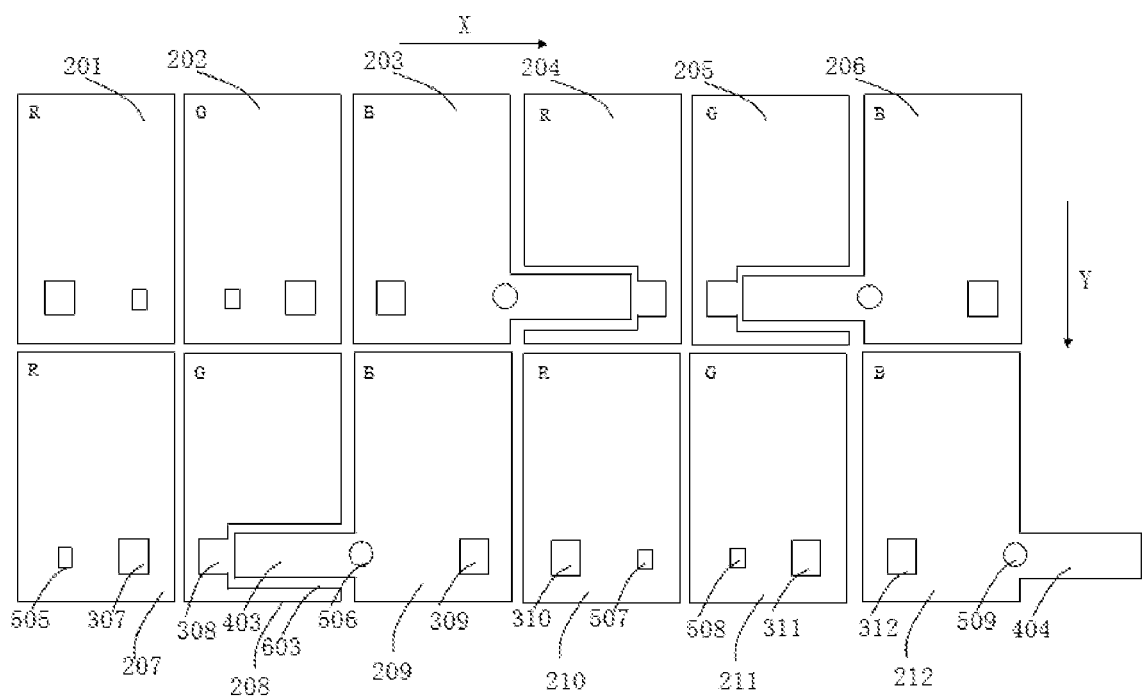
FIG. 7 is a schematic view illustrating a part structure of a further color filter layer of the liquid crystal panel provided in the second example embodiment of this application.

Referring to FIGS. 5 and 7, the plurality of color resist blocks further comprise a seventh color resist block 207. The seventh color resist block 207 is arranged in the second direction Y with respect to the first color resist block 201, wherein the second direction Y intersects the first direction X. In the instant embodiment, the second direction Y can be perpendicular to the first direction X and the second direction Y is in a lengthwise direction of the color resist blocks. The plurality of spacers further comprise a fifth spacer 505. The fifth spacer 505 is set at a location corresponding to the first zone A1 of the seventh color resist block 207. The fifth spacer 505 can be a secondary spacer, and the fifth spacer 505 can be of a structure that is similar to the structure of the second spacer 502 and the third spacer 503. The second zone A2 of the seventh color resist block 207 comprise a seventh through hole 307, which is provided for conductive connection between conductive layers of upper and lower sides of the seventh color resist block 207.

Further, the plurality of color resist blocks further comprise an eighth color resist block 208 and a ninth color resist block 209. The seventh color resist block 207, the eighth color resist block 208, and the ninth color resist block 209 are arranged, in sequence, in the first direction X. The eighth color resist block 208 can be of a structure that is similar to the structure of the fifth color resist block 205. The ninth color resist block 209 can be of a structure that is similar to the structure of the sixth color resist block 206. The eighth color resist block 208 comprises a third extension section 403. The second zone A2 of the eighth color resist block 208 comprises a third receiving notch 603 formed to receive the third extension section 403. The first zone A1 of the eighth color resist block 208 comprises an eighth through hole 308. The second zone A2 of the ninth color resist block 209 comprises a ninth through hole 309. The plurality of spacers further comprise a sixth spacer 506. The sixth spacer 506 is set at a location corresponding to the third extension section 403 or the first zone A1 of the eighth color resist block 208. The sixth spacer 506 can be of a structure that is similar to the structure of the first spacer 501 and they both are primary spacers. The relative position of the sixth spacer 506 with respect to the eighth color resist block 208 can be the same as the relative position of the first spacer 501 with respect to the third color resist block 203 and repeated description will be omitted herein.

Further, the plurality of color resist blocks further comprise a tenth color resist block 210. The tenth color resist block 210 is located at one side of the ninth color resist block 209 that is distant from the eighth color resist block 208. The tenth color resist block 210 can be of a structure that is similar to the structure of the first color resist block 201. The first zone A1 of the tenth color resist block 210 comprises a tenth through hole 310. The plurality of spacers further comprise a seventh spacer 507. The seventh spacer 507 is set at a location corresponding to the second zone A2 of the tenth color resist block 210. The seventh spacer 507 can be a secondary spacer.

Further, the plurality of color resist blocks further comprise an eleventh color resist block 211 and a twelfth color resist block 212. The tenth color resist block 210, the eleventh color resist block 211, and the twelfth color resist block 212 are arranged, in sequence, in the first direction X. The eleventh color resist block 211 is set at a location corresponding to the the second color resist block 202. The twelfth color resist block 212 can be of a structure that is similar to the structure of the third color resist block 203. The twelfth color resist block 212 comprises a fourth extension section 404. The second zone A2 of the eleventh color resist block 211 comprises an eleventh through hole 311. The first zone A1 of the twelfth color resist block 212 comprises a twelfth through hole 312.

The plurality of spacers further comprise an eighth spacer 508 and a ninth spacer 509. The eighth spacer 508 is set at a location corresponding to the first zone A1 of the eleventh color resist block 211. The ninth spacer 509 is set at a location corresponding to the fourth extension section 404 or the second zone A2 of the twelfth color resist block 212. The eighth spacer 508 can be a secondary spacer; and the ninth spacer 509 is set at a location corresponding to the first spacer 501 and they are both primary spacers. The relative position of the ninth spacer 509 with respect to the twelfth color resist block 212 can be the same as the relative position of the first spacer 501 with respect to the third color resist block 203 and repeated description will be omitted herein.

In this application, since the fourth color resist block 204, the fifth color resist block 205, and the eighth color resist block 208 are each provided with no spacer, it is possible to set, based on the size of the known secondary spacers, the sizes of the second spacer 502, the third spacer 503, the fifth spacer 505, the seventh spacer 507, and the eighth spacer 508 to ensure overall support force of the liquid crystal panel 100.

In this application, the first color resist block 201, the third color resist block 203, and the fifth color resist block 205 are each structured to have a through hole region set in the first zone A1; the second color resist block 202, the fourth color resist block 204, and the sixth color resist block 206 are structured to have a through hole region set in the second zone A2; the seventh color resist block 207, the ninth color resist block 209, and the eleventh color resist block 211 are structured to have a through hole region set in the second zone A2; and the eighth color resist block 208, the tenth color resist block 210, and the twelfth color resist block 212 are structured to have a through hole region set in the first zone A1, so that interference among source electrode lines provided on the liquid crystal panel 100 can be reduced to thereby reduce the occurrence of dark patterns and thus improving display quality of the liquid crystal panel 100.

Optionally, the first spacer 501, the fourth spacer 504, the sixth spacer 506, and the ninth spacer 509 are primary spacers, and the second spacer 502, the third spacer 503, the fifth spacer 505, the seventh spacer 507, and the eighth spacer 508 are secondary spacers. It can be appreciated that this application does not impose any specific limitations to the number and structure of the spacers.

Optionally, the first color resist block 201 to the sixth color resist block 206 can be respectively red, green, blue, red, green, and blue color resists, while the seventh color resist block 207 to the twelfth color resist block 212 are respectively red, green, blue, red, green, and blue color resists, but not limited thereto.

It is appreciated that FIG. 7 shows only a part of the liquid crystal panel 100 of this application and the description of this application is made on the basis of an example that includes a partial area formed of only twelve (12) color resist blocks, but this is not intended to provide a constraint to the scope of protection sought for this application. The liquid crystal panel 100 may comprise multiple ones of the partial area shown in FIG. 7.

In summary, although the above disclosure provides the preferred embodiments of this application, the preferred embodiments are not intended to limit this application. For those having ordinary skills in the art, various changes and modifications are available without departing from the sprit and scope of this application. Thus, the scope of protection of this application is only determined by the appended claims.

What is claimed is:

1. A liquid crystal panel, comprising a plurality of color resist blocks and a plurality of spacers respectively arranged at one side of the color resist blocks, each of the color resist blocks comprising a first zone and a second zone arranged in sequence in a first direction, the plurality of color resist blocks comprising a first color resist block, a second color resist block, and a third color resist block arranged in sequence in the first direction, the first zone of the third color resist block being formed with a first through hole, the third color resist block comprising a first extension section extending from the second zone of the third color resist block, the first extension section extending in the first direction, the plurality of spacers comprising a first spacer, the first spacer being set at a location corresponding to the first extension section or the second zone of the third color resist block, and wherein the first zone of the first color resist block and the second zone of the second color resist block are formed with a second through hole and a third through hole, respectively, and the plurality of spacers further comprise a second spacer and a third spacer, the second spacer and the third spacer being set at locations corresponding, respectively, to the second zone of the first color resist block and the first zone of the second color resist block.

2. The liquid crystal panel according to claim 1, wherein the first zone of the first color resist block and the second zone of the second color resist block are formed with a second through hole and a third through hole, respectively, and the plurality of spacers further comprise a second spacer and a third spacer, the second spacer and the third spacer being set at locations corresponding, respectively, to the first zone of the first color resist block and the first zone of the second color resist block.

3. The liquid crystal panel according to claim 1, wherein the plurality of color resist blocks further comprise a fourth color resist block, the fourth color resist block being located at one side of the third color resist block that is distant from the second color resist block, the fourth color resist block having a first zone that comprises a first receiving notch formed to receive the first extension section, the fourth color resist block having a second zone that is formed with a fourth through hole, the first receiving notch being connected to and in communication with the fourth through hole.

4. The liquid crystal panel according to claim 3, wherein the plurality of color resist blocks further comprise a fifth color resist block and a sixth color resist block, and the fourth color resist block, the fifth color resist block, and the sixth color resist block are arranged in sequence in the first direction, the sixth color resist block comprising a second extension section extending from a first zone of the sixth color resist block, the second extension section having an extension direction that is opposite to the first direction, the sixth color resist block having a second zone that is formed with a fifth through hole, the fifth color resist block having a second zone that comprises a second receiving notch formed to receive the second extension section, the plurality of spacers further comprising a fourth spacer, the fourth spacer being set at a location corresponding to the second extension section or the first zone of the sixth color resist block.

5. The liquid crystal panel according to claim 4, wherein a first zone of the fifth color resist block is formed with a sixth through hole, the sixth through hole being connected to and in communication with the second receiving notch.

6. The liquid crystal panel according to claim 5, wherein the plurality of color resist blocks further comprise a seventh color resist block, the seventh color resist block and the first color resist block being arranged in a second direction, the second direction and the first direction intersecting each other, the plurality of spacers further comprising a fifth spacer, the fifth spacer being set at a location corresponding to a first zone of the seventh color resist block, the seventh color resist block having a second zone that is formed with a seventh through hole.

7. The liquid crystal panel according to claim 6, wherein the plurality of color resist blocks further comprise an eighth color resist block and a ninth color resist block, and the seventh color resist block, the eighth color resist block, and the ninth color resist block are arranged in sequence in the first direction, the eighth color resist block having a structure similar to a structure of the fifth color resist block, the ninth color resist block having a structure similar to a structure of the sixth color resist block, the eighth color resist block comprising a third extension section, the plurality of spacers further comprising a sixth spacer, the sixth spacer being set at a location corresponding to the third extension section or a first zone of the eighth color resist block.

8. The liquid crystal panel according to claim 7, wherein the plurality of color resist blocks further comprise a tenth color resist block, the tenth color resist block being set at one side of the ninth color resist block that is distant from the eighth color resist block, the tenth color resist block having a structure similar to the structure of the first color resist block, the plurality of spacers further comprising a seventh spacer, the seventh spacer being set at a location corresponding to a second zone of the tenth color resist block.

9. The liquid crystal panel according to claim 8, wherein the plurality of color resist blocks further comprise an eleventh color resist block and a twelfth color resist block, and the tenth color resist block, the eleventh color resist block, and the twelfth color resist block are arranged in sequence in the first direction, the eleventh color resist block having a structure similar to the structure of the second color resist block, the twelfth color resist block having a structure similar to the structure of the third color resist block, the twelfth color resist block comprising a fourth extension section, the plurality of spacers further comprising an eighth spacer and a ninth spacer, the eighth spacer being set at a location corresponding to a first zone of the eleventh color resist block, the ninth spacer being set at a location corresponding to the fourth extension section or a second zone of the twelfth color resist block.

* * * * *